Feb. 25, 1964 A. F. GLEDHILL 3,122,023
MOTION METERS
Filed March 30, 1961 2 Sheets-Sheet 1

INVENTOR.
ALVIN F. GLEDHILL
BY
ATTORNEY

INVENTOR.
ALVIN F. GLEDHILL
BY
ATTORNEY

United States Patent Office 3,122,023
Patented Feb. 25, 1964

3,122,023
MOTION METERS
Alvin F. Gledhill, Seattle, Wash., assignor to Boeing Airplane Company, Seattle, Wash., a corporation of Delaware
Filed Mar. 30, 1961, Ser. No. 99,452
9 Claims. (Cl. 73—490)

This invention relates to a motion meter of the mechanical type, and more particularly, to a distance meter for measuring the distance that a movable object associated therewith has travelled.

There are many known types of meters that can be associated with a movable object in order to determine the distance that the object has travelled. One of the more common of such meters comprises electronic components. In such a prior art meter, the distance travelled by the movable object is determined by twice electrically integrating a signal proportional to the acceleration of the movable object. Thus, such a device is relatively complex and expensive.

Therefore, an object of this invention is to provide a compact mechanical device which is mounted on the movable object and which functions to measure, for instance, the velocity of the movable object or the distance travelled by the object by determining the physical relationship between a nut and its associated screw member.

Another object of this invention is to provide for rendering such a measuring device still more compact by rendering a moment of inertia member responsive to the rotary motion of the screw member.

Still another object of this invention is to provide for rendering such a measuring device still more compact by interconnecting a gear train between the screw member and the moment of inertia member to thus minimize the $WR^2$ required of the moment of inertia member, and thereby minimize the size of the moment of inertia member.

Figure 1:
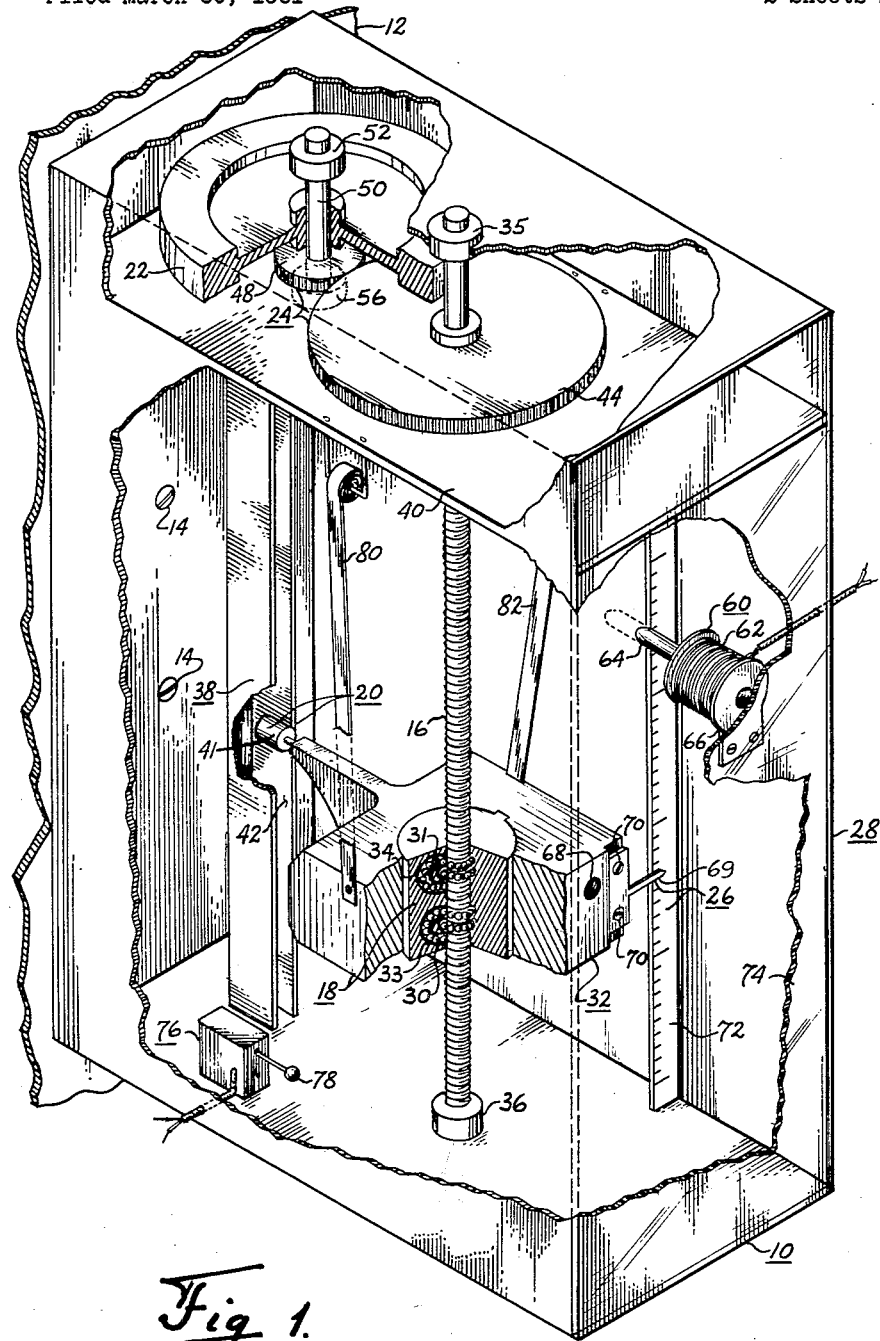
Figure 2:
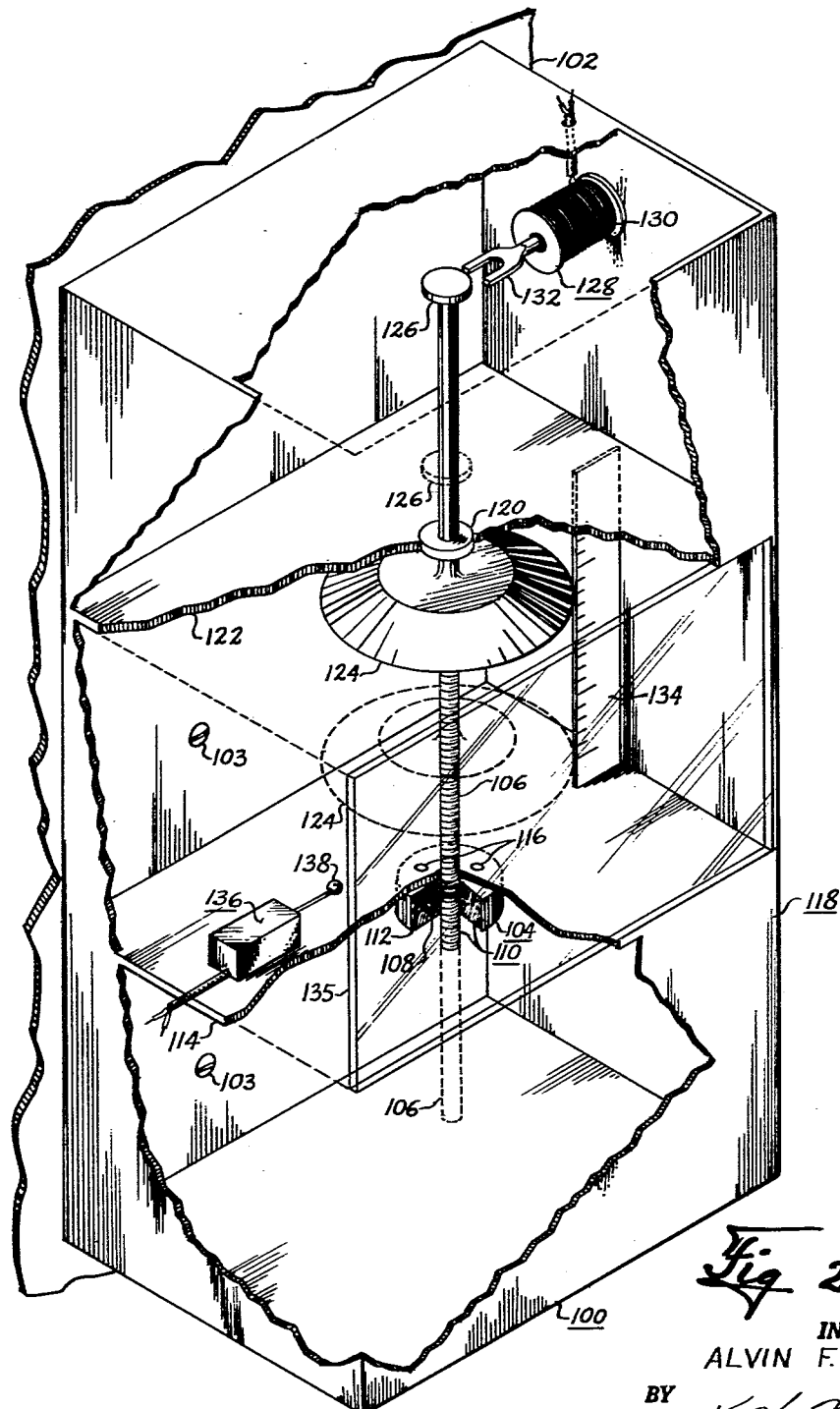

Other objects of this invention will become apparent from the following description when taken in conjunction with the accompanying drawings in which:

FIG. 1 is a schematic diagram of one embodiment of the teachings of this invention in which the nut and screw assembly of the distance meter is so mounted that the nut, upon movement of the movable object, moves axially along the male screw member, and FIG. 2 is a schematic diagram of another embodiment of the teachings of this invention in which the nut and screw assembly of the distance meter is so mounted that the nut is maintained in fixed position relative to the movable object and the male screw member moves axially through the nut upon movement of the movable object.

Referring to FIG. 1 there is illustrated a distance meter 10, which is suitably mounted to a movable object 12 by means of mounting screws 14, for measuring the distance that the movable object 12 travels and for effecting a control function. In the particular embodiment illustrated the movable object 12 is a missile. After the missile 12 has travelled a predetermined distance, the distance meter 10 effects a control function with respect to the missile 12. However, it is to be understood that prior to reaching the predetermined distance the distance meter 10 continually gives an indication of the distance travelled by the missile 12. Also, as will be explained hereinafter, with slight modification the distance meter 10 can be adapted to measure the distance that an object travels in a horizontal direction.

In general, the distance meter 10 comprises a low pitch threaded male screw member 16 which is ground and highly polished and which has a constant thread lead angle and which is mounted for rotation relative to the movable object 12; an internally threaded ball-screw nut 18 adapted for operation with the male screw member 16 so as to permit relative axial movement between the ball-screw nut 18 and the male screw member 16; means 20 for preventing the ball-screw nut 18 from rotating relative to the movable object 12; a moment of inertia wheel 22 connected to be responsive to the rotation of the male screw member 16; a gear train 24 interconnected between the male screw member 16 and the moment of inertia wheel 22; means 26 for determining the physical relationship between the ball-screw nut 18 and the male screw member 16; and a housing 28 for enclosing the members 16 through 26.

As illustrated, ball bearings 30 and 31 are interposed between the thread of the male screw member 16 and the thread of the nut 18, to thus establish a ball bearing screw and nut assembly 32 which has a minimum of friction. Specifically, the physical structure of the ball bearing screw and nut assembly 32 is such that the ball bearings 30 and 31 move in two endless type of passageways 33 and 34, respectively, a portion of the passageways 33 and 34 functioning as a return path for the ball bearings 30 and 31, respectively.

In order to support the male screw member 16, and yet provide freedom of rotation of the male screw member 16 relative to the housing 28 and the movable object 12, the male screw member 16 is disposed in suitable bearings 35 and 36 which in turn are disposed in fixed relationship with respect to the housing 28. The male screw member 16 and bearings 35 and 36 are so constructed as to permit rotation of the male screw member 16 and yet prevent axial movement of the male screw member 16 relative to the housing 28 and the movable object 12.

For the purpose of restraining the ball-screw nut 18 from rotating relative to the housing 28 and thus to the movable object 12, a restraining and guide member 38, having a U-shaped cross-section, is suitably secured to the bottom of the housing 28 and to a dividing wall 40 which in turn is suitably secured to the housing 28. A freely rotatable roller 41 is mounted to the ball-screw nut 18 so that as the nut 18 moves in an axial direction the roller 41 rolls along the internal surface 42 of the restraining and guide member 38, thereby preventing the nut 18 from rotating relative to the housing 28 and thus to the movable object 12.

In order to render the distance meter 10 as compact as possible, the male screw member 16 has, as hereinbefore mentioned, a low pitch thread. Further compactness of the distance meter 10 is effected by providing the moment of inertia wheel 22 and rendering the wheel 22 responsive to the rotation of the male screw member 16. In other words, if the moment of inertia wheel 22 were not provided, in order to obtain the desired moment of inertia for the male screw member 16, the moment of inertia of the male screw member 16 would have to be increased by for instance making the length or diameter of the male screw member 16 greater. However, increasing the diameter of the male screw member 16 increases the friction in the ball bearing screw and nut assembly 32 to thus decrease the accuracy of the distance meter 10.

The gear train 24, which comprises step-up gearing, is interposed between the male screw member 16 and the moment of inertia wheel 22 so that the moment of inertia wheel 22 rotates faster than the male screw member 16, thereby obtaining the desired moment of inertia with a moment of inertia wheel having a smaller moment of inertia. Therefore, the size of the moment of inertia wheel 22 is minimized, thereby effecting a more compact distance meter 10.

In particular, the gear train 24 includes two spur gears 44 and 48, the spur gear 44 being keyed to the male screw member 16 and the spur gear 48 being keyed to the moment of inertia wheel shaft 50 which is disposed to freely rotate in bearings 52 and 56 which are fixedly mounted to the housing 28 and to the divider wall 40, respectively. Of course, the moment of inertia wheel 22 is also keyed to its shaft 50. On the other hand, the shaft 50 and the bearings 52 and 56 are so constructed as to prevent an axial movement of the shaft 50 relative to the housing 28.

In order to prevent an axial movement of the ball-screw nut 18 with respect to the male screw member 16 before putting the distance meter 10 into operation, an electrical device 60 having an operating coil 62 and a movable armature 64 is provided. As shown, the electrical device 60 is fixedly mounted to the housing 28 by means of a bracket 66. Before the distance meter 10 is put into operation the movable armature 64 is biased to the dotted position and is disposed within an aperture 68 of the ball-screw nut 18.

As hereinbefore mentioned, means 26 is provided for determining the physical relationship between the ball-screw nut 18 and the male screw member 16. In this instance, the means 26 includes a pointer 69 which is fixedly mounted to the ball-screw nut 18 by means of screws 70 and a vertically disposed member 72 which has a scale calibrated in terms of distance and which is suitably secured to the housing 28. A side 74, of the housing 28, is constructed of transparent material in order that the scale on the vertically disposed member 72 can be read.

For the purpose of effecting a control function after the movable object 12 has travelled a predetermined distance, a microswitch 76, having a movable button 78, is fixedly mounted to the housing 28. Thus, in operation when the movable object 12 has travelled the predetermined distance the ball-screw nut 18 comes into contact with the button 78, of the microswitch 76, to thus change the operating state of the microswitch 76, to thereby control apparatus (not shown) that is electrically connected to the microswitch 76. For instance, if the movable object 12 were a missile then after the missile had travelled the predetermined distance the microswitch 76 would effect a separation of one of the stages (not shown) of the missile.

If the distance meter 10 is used to measure distance in a vertical direction, such as the flight of a missile, or effect a control function while travelling in a vertical direction, constant tension springs 80 and 82 should be provided in order to offset the effect of gravity and thus maintain the accuracy of the distance meter 10. As illustrated, one end of each of the constant-tension springs 80 and 82 is fixedly mounted to the ball-screw nut 18 while the other end of each of the springs 80 and 82 is fixedly mounted to the divider wall 40. Of course, it is to be understood that the constant tension springs 80 and 82 would be removed before utilizing the distance meter 10 for measuring distance in a horizontal direction or for effecting a control function while travelling in a horizontal direction. It is also to be understood that the microswitch 76 would be removed if one only wanted to determine the distance that the movable object 12 has travelled.

The operation of the distance meter 10 will now be described assuming that the movable object 12 is travelling in a vertical direction. Before movement of the movable object 12, the armature 64, of the electrical device 60, is disposed in the aperture 68 of the ball-screw nut 18. Just prior to movement of the movable object 12 the operating coil 62, of the electrical device 60, is energized to thus retract the armature 64 and thereby permit the ball-screw nut 18 to move downward along the male screw member 16 upon movement of the movable object 12. As the ball-screw nut 18 moves downward upon movement of the movable object 12, it is restrained from rotary motion by the restraining member 38. Thus, the downward movement of the ball-screw nut 18 effects a rotation of the male screw member 16 to thereby effect a rotation of the gear train 24 and the moment of inertia wheel 22. Once the ball-screw nut 18 travels a predetermined distance downward along the male screw member 16 it comes into contact with the button 78, of the microswitch 76, to thus change the operating state of the microswitch 76 and thereby effect the control function hereinbefore mentioned.

In order to reset the distance meter 10 the ball-screw nut 18 is returned to its original position and the operating coil 62, of the electrical device 60, is de-energized so that the armature 64 can be biased back into the aperture 68 of the ball-screw nut 18.

The reason why the distance meter 10 is capable of measuring distance can be better understood by consideration of the following equations in which:

$F$ = the axial force on the ball-screw nut 18
$a$ = the acceleration of the movable object 12
$T$ = the torque on the ball-screw nut 18
$\phi$ = angular acceleration of the male screw member 16
$w$ = the angular velocity of the male screw member 16, and
$\theta$ = angular movement of the male screw member 16

$$F \alpha a$$
$$T \alpha F$$
$$\therefore T \alpha a$$
$$\phi \alpha T$$
$$\therefore \phi \alpha a$$
$$\therefore w \alpha \int_0^t a\, dt$$

and $$\theta \alpha \int_0^t \int_0^t a\, dt$$

Since the male screw member 16 has a constant thread lead angle the axial displacement of the ball-screw nut 18 is proportional to the angular movement of the male screw member 16. Therefore, the distance meter 10 gives an indication of the distance travelled by the movable object 12.

Referring to FIG. 2 there is illustrated another embodiment of the teachings of this invention in which a distance meter 100 is mounted to a movable object 102 by means of screws 103 to measure the distance travelled by the movable object 102 when travelling in a horizontal direction and to effect, as will be explained hereinafter, a control function after the movable object 102 has travelled a predetermined distance in a horizontal direction. The main distinction between the apparatus shown in FIGS. 1 and 2 is that in the apparatus shown in FIG. 2 an internally threaded ball-screw nut 104 is maintained in fixed position while the associated low pitch threaded male screw member 106, having a constant thread lead angle and being ground and polished, is disposed to move in an axial direction with respect to the nut 104 upon movement of the movable object 102.

Similar to the nut and screw assembly 32, of FIG. 1, ball bearings 108 are disposed between the thread of the male screw member 106 and the thread of the ball-screw nut 104 in order to provide a ball bearing screw and nut assembly 110 having a minimum of friction. As was the case in the apparatus in FIG. 1, the ball bearings 108 are disposed to move in an endless passageway 112 one portion of which is disposed in the nut 104 and functions as a return path for the ball bearing 108.

The ball-screw nut 104 is maintained in fixed position by mounting it to a divider wall 114 by means of screws 116, the divider wall 114 being fixedly mounted to a housing 118. In order to prevent lateral movement of the male screw member 106 and yet permit angular and axial motion of the male screw member 106, the male screw member 106 is disposed in a suitable bearing 120 which is mounted in fixed relationship with respect to a divider wall 122 which is fixedly mounted to the housing 118.

For the purpose of obtaining the desired moment of inertia for the male screw member 106 while at the same time maintaining the distance meter 100 compact, a moment of inertia wheel 124 is keyed to the male screw member 106 so as to rotate therewith. As shown, one end of the male screw member 106 is provided with a circular-shaped flange 126 which cooperates with an electrical device 128, having an operating coil 130 and a movable armature 132, to prevent axial movement of the male screw member 106 before the distance meter 100 goes into operation.

In order to obtain an indication of the distance that the movable object 102 has travelled, a member 134, having a scale calibrated in terms of distance, is associated with the moment of inertia wheel 124 and is suitably secured to the housing 118. The distance travelled by the movable object 102 is read from the scale on the member 134 through a transparent window 135 in the housing 118.

A microswitch 136, having a movable button 138, is fixedly mounted to the divider wall 114 so as to effect a control function when the moment of inertia wheel 124 comes into contact with the button 138, to thus change the operating state of the microswitch 136. Of course, if such a control function is not desired and the only thing sought is an indication of the distance travelled by the movable object 102 then the microswitch 136 can be eliminated.

The operation of the apparatus shown in FIG. 2 will now be described. When the movable object 102 is not in motion, the movable armature 132, of the electrical device 128, is biased so as to be disposed underneath the circular flange 126, of the male screw member 106, to thus prevent axial movement of the male screw member 106. Just before putting the distance meter 100 into operation to determine the distance travelled by the movable object 102 the operating coil 130, of the electrical device 128, is energized to thereby retract the movable armature 132 to the position shown, thus permitting the male screw member 106 to move axially with respect to the ball-screw nut 104. Upon movement of the movable object 102 through a predetermined distance the male screw member 106 and the moment of inertia wheel 124 assume a position such as the position shown by the dotted lines in FIG. 2. If there is no further movement of the movable object 102 the distance travelled then can be read from the scale on the member 134, this being determined by the scale marking that is disposed opposite the moment of inertia wheel 124. However, upon further movement of the movable object 102, the moment of inertia wheel 124 will come into contact with the button 138, of the microswitch 136, to thereby effect the desired control function. After a reading of distance travelled by the object 102 is obtained or the control function is performed the distance meter 100 is reset to its original position for future use.

Although the distance meters 10 and 100 have been described for measuring distance while travelling in a vertical or horizontal direction, it is to be understood that these meters are suitable for measuring the distance travelled by an object when travelling at some angle to the horizontal provided some means, such as the constant tension springs 80 and 82, are provided to compensate for the effect of gravity. It is also to be understood that the distance meters 10 and 100 could be converted to devices for measuring the velocity of a movable object by incorporating means (not shown) for determining the angular velocity of the male screw members 16 and 106, respectively.

The apparatuses embodying the teachings of this invention have several advantages. For instance, they are of simple construction and are compact. Therefore, their original cost of manufacture is relatively low and maintenance problems are minimized.

Since certain changes may be made in the above described apparatus and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a motion meter adapted to be carried by a movable object, the combination comprising, a screw and nut assembly including a threaded male screw member mounted for rotation relative to the movable object but restrained from axial movement with respect to the movable object and an internally threaded nut adapted for operative engagement with said male screw member so as to permit only frictional restraint in axial movement between said internally threaded nut and said male screw member, means for preventing said internally threaded nut from rotating relative to the movable object, a moment of inertia member interconnected with said male screw member so that upon movement of the movable object both said male screw member and said moment of inertia member rotate, and means associated with said screw and nut assembly for determining the relative axial positioning between said internally threaded nut and said male screw member.

2. In a distance measuring device adapted to be carried by a movable object, the combination comprising, a threaded male screw member mounted for rotation relative to the movable object but restrained from axial movement with respect to the movable object, a nut so adapted for operative engagement with said male screw member as to permit only frictional restraint in axial movement of said nut along said male screw member, means for restraining rotation of said nut relative to the movable object to thus effect only frictionally restrained axial movement of said nut along said male screw member when an axial force is applied to said nut, a moment of inertia member interconnected with said male screw member so that upon movement of the movable object both said male screw member and said moment of inertia member rotate relative to each said member, and means associated with said nut for determining the distance that said nut moves along said male screw member when the axial force is applied to said nut.

3. In a distance measuring device adapted to be carried by a movable object, the combination comprising, a threaded male screw member mounted for rotation relative to the movable object but restrained from axial movement with respect to the movable object, a nut so adapted for operative engagement with said male screw member as to permit only frictional restraint in axial movement of said nut along said male screw member; means for restraining rotation of said nut relative to the movable object to thus effect only frictionally restrained axial movement of said nut along said male screw member when an axial force is applied to said nut, and means associated with said nut for determining the distance that said nut moves along said male screw member when the axial force is applied to said nut.

4. In a distance measuring device adapted to be carried by a movable object, the combination comprising, a ball bearing screw and nut assembly including a male screw member and a nut so disposed on said male screw member as to permit only frictional restraint in axial movement of said nut along said male screw member, means for so mounting said ball bearing screw and nut assembly on the movable object that said male screw member is permitted to rotate relative to the movable object but is restrained from moving axially with respect to the movable object and said nut is restrained from rotating relative to the movable object, thereby effecting only frictionally restrained axial movement of said nut along said male screw member when an axial force is applied to said nut, a moment of inertia member, a gearing-up gear system interconnected between said male screw member and said moment of inertia member so that when said axial force is applied to said nut both said male screw member and said moment of inertia member rotate, and means associated with said nut for determining the distance that said nut moves along said male screw member when the axial force is applied to said nut.

5. In a distance measuring device adapted to be carried by a movable object, the combination comprising, a ball bearing screw and nut assembly including a male screw member and a nut so disposed on said male screw member as to permit only frictional restraint in axial movement of said nut along said male screw member, means for so mounting said ball bearing screw and nut assembly on the movable object that said male screw member is permitted to rotate relative to said movable object but is restrained from moving axially with respect to the movable object and said nut is restrained from rotating relative to the movable object, thereby effecting only frictionally restrained axial movement of said nut along said male screw member when an axial force is applied to said nut, a wheel shaped moment of inertia member, a gearing-up gear system so interconnected between said male screw member and said moment of inertia member that when said axial force is applied to said nut both said male screw member and said moment of inertia member rotate, and means associated with said nut for determining the distance that said nut moves along said male screw member when said axial force is applied to said nut.

6. In a distance measuring device adapted to be carried by a vertically rising movable object, the combination comprising, a ball bearing screw and nut assembly including a male screw member and a nut so disposed on said male screw member as to permit substantially free axial movement of said nut along said male screw member, means for so mounting said ball bearing screw and nut assembly on the movable object that said male screw member is permitted to rotate relative to the movable object but is restrained from moving axially with respect to the movable object and said nut is restrained from rotating relative to the movable object, thereby effecting substantially free axial movement of said nut along said male screw member when an axial force is applied to said nut, a moment of inertia member, a gearing-up gear system so interconnected between said male screw member and said moment of inertia member that when said axial force is applied to said nut both said male screw member and said moment of inertia member rotate, constant tension spring means interconnected between said nut and said mounting means for compensating for the effect of gravity upon upward movement of said movable object, and means associated with said nut for determining the distance that said nut moves along said male screw member when the axial force is applied to said nut.

7. In a distance measuring device adapted to be carried by a movable object, the combination comprising, a threaded male screw member mounted for rotation relative to said movable object, an internally threaded nut adapted for operative engagement with said male screw member so as to permit substantially free axial movement of said male screw member relative to said nut, a moment of inertia member connected for rotation with said male screw member, means for restraining movement of said nut relative to said movable object so as to effect substantially free axial movement of said male screw member and said moment of inertia member relative to said nut when an axial force is applied to said moment of inertia member, and means associated with said moment of inertia member for determining the axial distance that said moment of inertia member moves when said axial force is applied thereto.

8. In a distance measuring device adapted to be carried by a movable object, the combination comprising, an internally threaded nut mounted stationary with respect to the movable object, a threaded male screw member mounted for rotation relative to said movable object and disposed for substantially free axial movement through said stationary nut, ball bearings disposed between said threaded male screw member and said stationary nut for cooperation with the threads of said nut and said member to thereby effect a minimum of friction, a wheel shaped moment of inertia member connected to said threaded male screw member for rotation therewith so that upon movement of the movable object an axial force is applied to said moment of inertia member thereby effecting substantially free movement of said threaded male screw member through said stationary nut, and means associated with said moment of inertia member for determining the axial distance that said moment of inertia member moves when said axial force is applied thereto.

9. In a motion meter adapted to be carried by a movable object, the combination comprising, a screw and nut assembly including a threaded male screw member mounted for rotation relative to the movable object but restrained from axial movement with respect to the movable object and an internally threaded nut adapted for operative engagement with said male screw member so as to permit only frictional restraint and single directional axial movement between said internally threaded nut and said male screw member when said movable object is moving, means for preventing said internally threaded nut from rotating relative to the movable object, a moment of inertia member interconnected with said male screw member so that upon movement of the movable object both said male screw member and said moment of inertia member rotate, and means associated with said screw and nut assembly for determining the relative axial positioning between said internally threaded nut and said male screw member.

References Cited in the file of this patent
UNITED STATES PATENTS

| | | |
|---|---|---|
| 2,289,864 | Belinkine | July 14, 1942 |
| 2,797,911 | Montgomery | July 2, 1957 |
| 2,861,789 | Pope | Nov. 25, 1958 |
| 2,898,416 | Clurman | Aug. 4, 1959 |
| 2,979,942 | Allen | Apr. 11, 1961 |
| 3,066,450 | Severance | Dec. 4, 1962 |